United States Patent [19]

Tatami

[11] Patent Number: 4,680,658
[45] Date of Patent: Jul. 14, 1987

[54] APPARATUS FOR CORRECTING A TIME BASE ERROR AND FOR COMPENSATING DROPOUTS INCLUDED IN A REPRODUCED VIDEO SIGNAL

[75] Inventor: Mitsushige Tatami, Kanagawa, Japan

[73] Assignee: Sony Corporation, Tokyo, Japan

[21] Appl. No.: 737,079

[22] Filed: May 23, 1985

[30] Foreign Application Priority Data

May 26, 1984 [JP] Japan ................... 59-107294

[51] Int. Cl.$^4$ .................... H04N 5/94; H04N 5/95
[52] U.S. Cl. .................... 360/36.2; 360/38.1;
358/336; 358/339; 358/314; 358/320
[58] Field of Search .............. 360/38.1, 36.2, 36.1,
360/32; 358/336, 339, 337, 314, 320, 310

[56] References Cited

U.S. PATENT DOCUMENTS

| 4,165,524 | 8/1979 | Ninomiya | 358/326 |
| 4,389,678 | 6/1983 | Mizukami | 360/36.2 |
| 4,555,734 | 11/1985 | Fukui | 360/38.1 |
| 4,577,236 | 3/1986 | Takanashi | 360/36.2 |

*Primary Examiner*—Alan Faber
*Attorney, Agent, or Firm*—Lewis H. Eslinger; Alvin Sinderbrand

[57] ABSTRACT

An apparatus for correcting time base errors and for compensating for dropouts in a reproduced video signal includes a single random access memory for storing digital video data, a correct video data producing circuit connected to the memory for producing correct video data from data read out from the memory, a switching circuit controlled by a dropout detecting pulse for supplying either the digital video data or the correct video data to the memory and a control circuit for controlling read and write address operations of the memory. The read and write address operations include the generation of a write address signal indicating a write address at which an output signal of the switching circuit is written upon generation of the write address signal, a first read address signal asynchronous with the write address signal indicating a read address from which data is read out without time base errors and a second read address signal generated previous to the generation of the write address signal indicating an address differing from the write address by a predetermined distance so that data read out from the memory is supplied back to the memory for compensating for dropout errors. The timing and address differences of the three address signals enable the single memory to be used in place of two separate memories.

5 Claims, 11 Drawing Figures

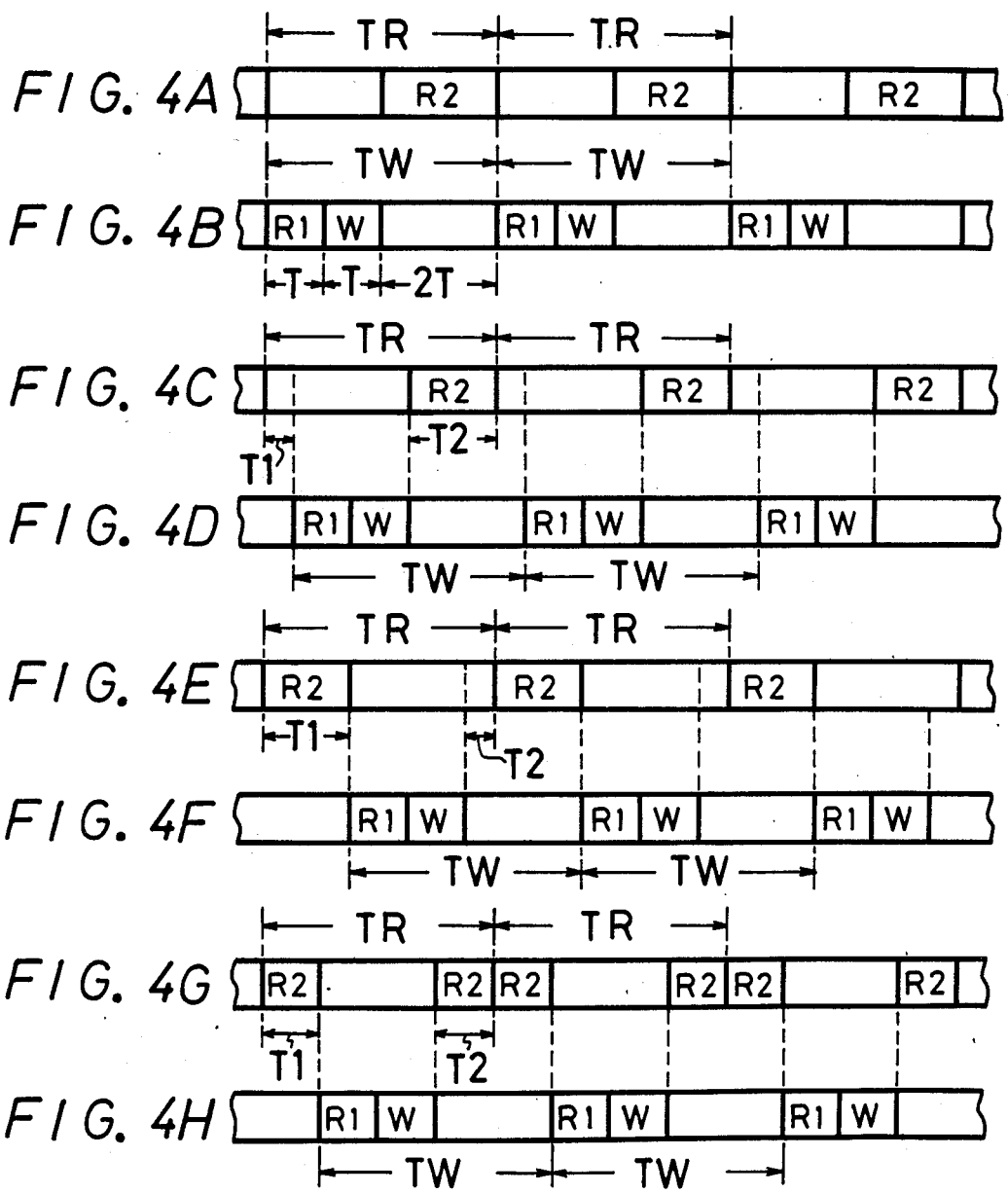

APPARATUS FOR CORRECTING A TIME BASE ERROR AND FOR COMPENSATING DROPOUTS INCLUDED IN A REPRODUCED VIDEO SIGNAL

BACKGROUND OF THE INVENTION

1. Field of the Invention

The present invention relates generally to a circuit for correcting a reproduced signal and particularly to a reproduced signal correcting circuit for correcting a time base error of a video signal reproduced from a video tape recorder (VTR) and for compensating for its dropouts. More particularly but not exclusively, this invention relates to an apparatus in which a time base error correcting memory is also used as a dropout compensating memory for carrying out the above-described correction and compensation of the reproduced signal.

2. Description of the Prior Art

Generally in the prior art VTR, a time base error corrector (TBC) and a frame synchronizer are used to directly process a reproduced signal that is played back one after another from a magnetic tape. In this case, a dropout of the reproduced signal is compensated for by a dropout compensating circuit which is provided at the stage prior to the TBC, the frame synchronizer and the like. Such circuit arrangement is generally formed as shown in FIG. 1. This circuit arrangement is disclosed in greater detail in, for example, U.S. Pat. No. 4,165,524. This prior art circuit arrangement will hereinafter be described below briefly.

As shown in FIG. 1, a recorded signal played back from a magnetic tape 1 by a magnetic head 2 is supplied to and processed by a reproducing circuit 3 and then converted to a digital signal by an analog-to-digital (A/D) converting circuit 4 as a reproduced digital signal RD. This digital signal RD is supplied to a dropout compensating circuit 5.

The dropout compensating circuit 5 comprises a dropout compensating memory 6 which receives the reproduced digital signal RD and a switching circuit 7 which is changed in position by a dropout detecting signal DO. The switching circuit 7 is changed in position by the dropout detecting signal DO that is independently detected by a detecting circuit (not shown) when the dropout occurs in the reproduced digital signal RD to thereby supply the output of the dropout compensating memory 6 to a time base error correcting circuit 8, whereas when no dropout occurs in the reproduced digital signal RD, the switching circuit 7 allows the reproduced digital signal RD to be supplied to the time base error correcting circuit 8 directly.

The dropout compensating circuit 5 operates such that as to the picture element having a dropout occurred, it is replaced with sampling signal of its one line or two lines before or with an average value of the sampling signals corresponding to the lines before and after the picture element having the dropout whereby the picture element having the dropout is compensated for. Accordingly, when the dropout occurs in the reproduced digital signal RD, such picture element can be compensated for by utilizing the correlation between the lines.

Further, in the time base error correcting circuit 8, a digital signal DOD obtained from the dropout compensating circuit 5 is received by its main memory 11. On the basis of a write signal WS obtained from a write/read control circuit 12, the main memory 11 stores at its predetermined address a sample data that is supplied thereto at every line. The data thus written in the main memory 11 is read out therefrom at a predetermined cycle on the basis of a read signal RS obtained from the write/read control circuit 12. This read-out data is supplied to and converted to an analog signal by a digital-to-analog (D/A) converting circuit 13 and then delivered therefrom as a reproduced output PBO. Thus, the reproduced output PBO is transmitted as the signal in which the jitter component thereof is corrected on the basis of the digital signal DOD in the cycle of the read signal RS.

As described above, in the prior art circuit arrangement shown in FIG. 1, the main memory 11 with the memory capacity available for at least ten and several lines must be provided and the dropout compensating memory 6 with the memory capacity of 1H (H is the horizontal period) or 2H must be provided so as to compensate for the dropout.

If the two memories 6 and 11 are provided independently from each other as mentioned above, the capacity of memory is increased on the whole of the circuit arrangement. In addition, the control circuits for independently operating the respective memories must be provided. Accordingly, this puts a limit on making the whole circuit arrangement small in size.

OBJECTS AND SUMMARY OF THE INVENTION

Accordingly, it is an object of this invention to provide an apparatus for correcting a time base error and for compensating a dropout of a reproduced signal in which a main memory is given a function of a dropout compensating memory.

It is another object of this invention to provide an apparatus for correcting a time base error and for compensating a dropout included in a reproduced signal in which the circuit arrangement can be made small in size.

According to one aspect of the present invention, there is provided an apparatus for correcting a time base error and for compensating a dropout included in a reproduced video signal from a record medium by using a transducing head comprising:

(a) an analog-to-digital converter for converting said reproduced video signal to a digital video data stream;

(b) a random access memory for memorizing said digital video data stream;

(c) a correct video data producing circuit connected to said memory for producing a correct video data from said digital video data stream read out from said memory;

(d) a switching circuit controlled by a dropout detecting pulse for selectively supplying said digital video data and said correct video data to said memory; and (e) a control circuit for controlling a write and read operation of said memory, said control circuit having a write address generator for generating a write address signal indicating a write address of said memory so that an output signal of said switching circuit is written into said memory, a first read address generator for generating a first read address signal indicating a read address of said memory, said first read address signal being asynchronous with said write address signal so that a digital video data memorized in said memory is read out without said time base error, and a second read address generator for generating a second read address signal previous to a generation of said write address signal, said second read address signal indicating an address having a predetermined distance from said write address so that said digital video data read out from said memory is supplied to said memory for compensating a dropout via said correct video data producing circuit during a generation of said dropout indicating pulse.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 4A to 4H are respectively diagrams useful for explaining the timings at which data is written in or read out from the main memory.

DESCRIPTION OF THE PREFERRED EMBODIMENT

Figure 2:
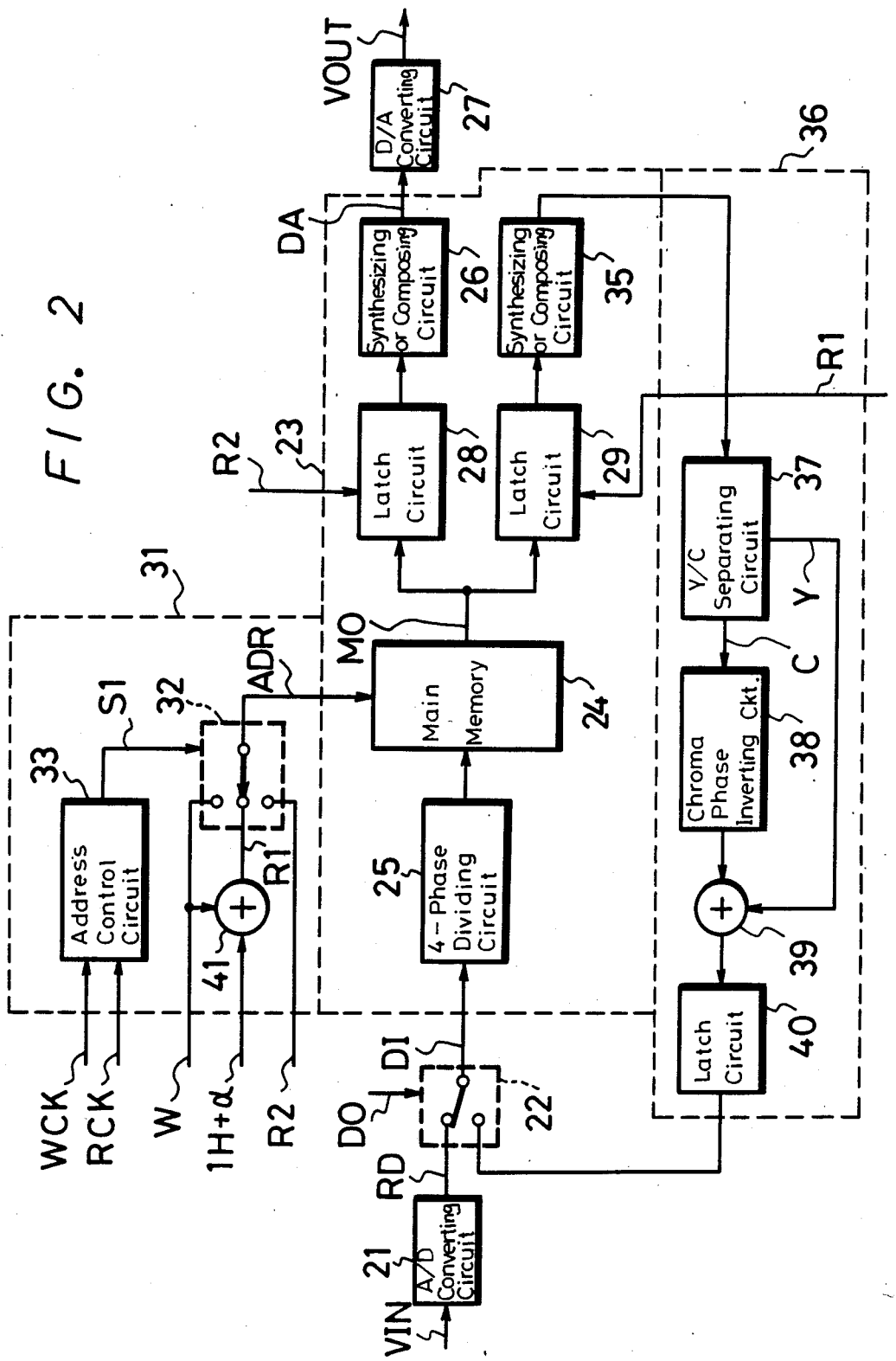
FIG. 2 is a circuit block diagram showing an embodiment of a circuit for correcting a time base error and for compensating dropouts of a reproduced signal according to the present invention.

Now, an embodiment of a circuit for correcting a time base error and for compensating a dropout included in a reproduced signal hereinafter be described with reference to the attached drawings. FIG. 2 schematically illustrates a circuit arrangement of the present invention.

As shown in FIG. 2, a reproduced input VIN is supplied to and converted to a reproduced digital signal RD by an A/D-converting circuit 21. This reproduced digital signal RD is supplied through a switching circuit 22, which is changed in position by a dropout detecting signal DO, to a main memory circuit 23.

The main memory circuit 23 includes a main memory 24 with a memory capacity of, for example, 16 line amounts. In this embodiment, the main memory 24 has memory areas of 4 series. An input data DI from the switching circuit 22 is divided in 4 phases by a 4 phase dividing circuit 25 and they are sequentially assigned to the respective series of the main memory 24 so that the data can be processed simultaneously in each series. Accordingly, the highspeed data processing can be made by using a memory whose access time is relatively low.

The data read out from the main memory 24 are supplied through a latch circuit 28 which is driven by an address signal R2 described later to a synthesizing or composing circuit 26 in which they are synthesized as a data signal of a single phase and then transmitted as a data output DA. This data output DA is supplied to and converted to an analog signal by a D/A (digital-to-analog)-converting circuit 27 and then delivered as a reproduced video output VOUT.

Figures 1, 3:
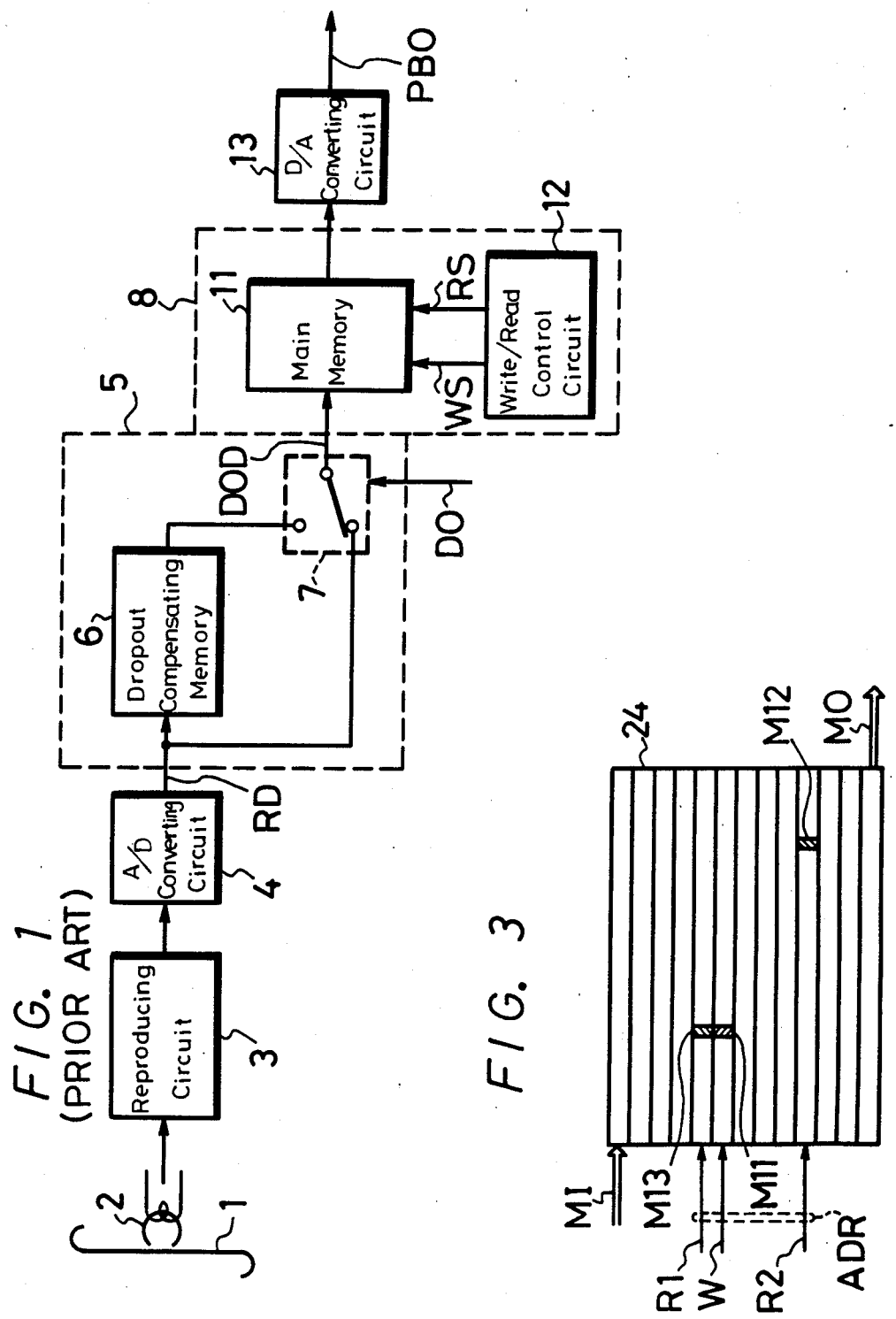
FIG. 1 is a circuit block diagram showing an example of a prior art circuit for correcting a time base error and for compensating a dropout of a reproduced signal.
FIG. 3 is a diagram showing an arrangement of the main memory used in the circuit of FIG. 2.

The main memory 24 is formed of a random access memory (RAM) and as shown in FIG. 3, an input data M1 is firstly written at an address M11 that is accessed by a time base error correcting write address signal W. Secondly, an output data MO is read out from an address M12 that is accessed by a time base error correcting read address signal R2 and thirdly, a data stored at an address M13 that is accessed by a dropout compensating read address signal R1 is transmitted as the output data MO.

The time base error correcting write address signal W and the read address signal R2 are generated in asynchronous relation with each other. That is, the read address signal R2 is generated at a predetermined constant cycle TR as shown in FIG. 4A, while the write address signal W is generated at a cycle TW that is determined on the basis of the synchronizing signal of the reproduced input VIN as shown in FIG. 4B. Accordingly, the write address signal W is supplied to the main memory 24 while fluctuating its cycle TW in response to the jitter produced in the reproduced input VIN, while the read address signal R2 is supplied to the main memory 24 at the predetermined constant cycle TR. Thus, as the output data MO, there is produced a data having no time base fluctuation. Then, a relative phase between the write address signal W and the read address signal R2 is being displaced one from another in accordance with the jitter of the reproduced input VIN.

Further, the relation of the data write-in and read-out from the main memory 24 is controlled in a time division manner such that the writing is dominant. Consequently, when a new input data M1 is supplied thereto, the main memory 24 can store such new input data M1 positively.

In addition, the dropout compensating read address signal R1 is supplied to the main memory 24 in synchronism with the write address signal W as shown in FIG. 4B. In this embodiment, at the timing just before the write address signal is supplied to the main memory 24, the read address signal R1 is supplied thereto. Accordingly, when the read address signal R1 is supplied to the main memory 24, the data stored at the address M13 is read out from the main memory 24 previous to the read address signal R2. Thereafter, the input data M1 is then written at the address M11 by the write address signal W and subsequently, the data MO stored at the address M12 is read out by the read address signal R2 that is low in priority order.

Turning back to FIG. 2, the timings at which the address signals W, R1 and R2 are supplied to the main memory 24 are determined by the selecting operation of an address selecting circuit 32 of a write/read control circuit 31. An address signal thus selected is supplied to the main memory 24 as its address signal ADR. The address selecting circuit 32 is changed in position by a control signal S1 which is supplied from an address control circuit 33 that receives a write clock signal WCK having a cycle TW and a read clock signal RCK having a cycle TR.

The data MO read out from the address M13 on the basis of the dropout compensating read address signal R1 as mentioned above is supplied through a latch circuit 29 which is driven by the address signal R1 and a synthesizing or composing circuit 35 to a compensated data forming circuit 36. When the dropout occurs in the data written by the time base correcting write address signal W, this compensated data forming circuit 36 compensates for the same by such a manner that the data is replaced with a sampling data that is, for example, one line before. In this compensated data forming circuit 36, a data supplied from the composing circuit 35 is separated by a luminance signal/chroma signal (Y/C) separating circuit 37, the chroma signal C is inverted in phase by a chroma phase inverting circuit 38 and composed with the luminance signal Y in a composing circuit 39. Then, the composed data is latched in a latch circuit 40. When the dropout detecting signal DO is supplied to the switching circuit 22, the data latched in the latch circuit 40 is supplied through this switching circuit 22 to the main memory circuit 23 as its input data DI.

In order that the content or data stored at the address M13 that is addressed by the dropout compensating read address signal R1 become such one at the address just one line before the address M11 that is to be written by the present write address signal W, when the dropout compensating read address signal R1 is supplied to the address selecting circuit 32, a constant value 1H+α is added to the write address signal W in an adding circuit 41.

In the above-described circuit arrangement, if the memory block is arranged such that the cycle TW of the time base error correcting write address signal W and the cycle TR of the time base correcting read address signal R2 become longer than four times the memory cycle of the main memory 24, the time base correcting operation and the dropout compensating operation can be carried out in a time division manner by using the main memory 24.

That is, as shown in FIGS. 4A and 4B, when the processing time of one data is T, if the interval in which the time base correcting write address signal W is supplied and the interval in which the dropout compensating read address signal R1 is supplied are taken as T and the interval in which the time base correcting read address signal R2 is supplied is taken as 2T, 3 operations of the writing of one data, the reading of the dropout compensating data and the reading of the time base correcting data can repeatedly be carried out in a time division manner during the write cycle TW and the read cycle TR.

Firstly, the data at the address M13 in which the sample data of just 1H before the present sample data which is to be written by the dropout compensating read address signal R1 is transmitted as the output data MO and then latched in the latch circuit 40 of the compensated data forming circuit 36. Subsequently, the input data now being supplied is written at the address M11 by the time base correcting write address signal W. Thereafter, on the basis of the time base error correcting read address signal R2, the sample data stored at the address M12 is read out as the data output MO, which then is supplied through the latch circuit 28 and the composing circuit 26 and delivered as the digital output data DA.

While such operation is repeated at every write cycle TW and read cycle TR, if the dropout occurs in the data, which is to be written at the address M11 by the time base correcting write address signal W, the switching circuit 22 is changed in position to the side of the latch circuit 40 by the dropout detecting signal DO to allow the sample data of 1H before stored in the latch circuit 40 to be supplied to the main memory circuit 23 as the digital input DI and then written at the address M11 of the main memory 24. Thus, the sample data having the dropout is compensated for by the sample data of 1H before.

Such time base error correcting operation and the dropout compensating operation can be positively carried out even if the relative phase between the time base error correcting write address signal W and the time base error read address signal R2 is displaced as shown in FIGS. 4C, 4D; 4E, 4F; and 4G, 4H.

As described above in connection with FIGS. 4A and 4B, from the condition that the dropout compensating read address signal R1 and the time base error correcting write address signal W are delivered during the former half of the cycle TR of the time base error correcting read address signal R2, if the phase of the time base error correcting write address signal W is delayed a little in accordance with the jitter, as shown in FIGS. 4C and 4D, the intervals of the address signals R1 and W in the cycle TR of the address signal R2 are delayed a little and the interval of the cycle TR is divided into the first interval T1 and the second interval T2. The reason for this is that the address signal W and hence R1 are supplied to the main memory 24 previous to the address signal R2.

In this case, however, the addresses accessed by the address signal R2 during the same cycle TR are the same so that the addresses to be accessed by the address signal R2 during the intervals T1 and T2 become the same. However, if the length of the interval T1 is shorter than the access time TA of the memory element, the interval in the interval TR in which the data is read out from the address M12 becomes the latter interval T2.

Further, if the phase of the time base error correcting address signal W is delayed more and becomes as shown in FIGS. 4E and 4F, the former interval T1 becomes longer than the access time TA, while the latter interval T2 becomes shorter than the access time TA. Accordingly, the interval in which the data is read out from the address M12 at this time becomes the former interval T1.

If the phase of the address signal W is displaced in the condition therebetween, or in such a condition that the former interval T1 and the latter interval T2 become both longer than the access time TA, the same address is accessed at both intervals T1 and T2. In this case, since the same data is read out from both of the intervals T1 and T2, a data from either of the intervals T1 and T2 may be used in practice.

As mentioned above, according to the circuit arrangement of FIG. 2, the time base error correcting operation and the dropout compensating operation can be realized by using the common main memory 24. Accordingly, as compared with a case in which a memory capacity is independently provided for carrying out these correcting and compensating operations, the memory capacity can be made small considerably.

As set forth above, according to the present invention, since the time base error correcting operation and the dropout compensating operation can be carried out by using the common memory, or the main memory, it is possible to realize an apparatus for correcting a time base error and for compensating a dropout included in a reproduced signal in which a memory capacity can be made smaller on the whole.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:
1. An apparatus for correcting a time base error and for compensating a dropout included in a video signal reproduced from a record medium by using a transducing head comprising:

analog-to-digital converter means for converting the reproduced video signal to a digital video data stream;

a single random access memory means for memorizing said digital video data stream;

correct video data producing circuit means connected to said memory means for producing correct video data from said digital video data stream read out from said memory means;

switching circuit means controlled by a dropout detecting pulse for selectively supplying said digital video data and said correct video data to said memory; and control circuit means for controlling a write and read operation of said memory means, said control circuit means having a write address generator for generating a write address signal indicating a write address of said memory at which an output signal of said switching circuit means is written into said memory means upon the generation of said write address signal, a first read address generator for generating a first read address signal indicating a read address of said memory means, said first read address signal being asynchronous with said write address signal so that digital video data memorized in said memory means is read out without said time base error, and a second read address generator for generating a second read address signal generated previous to said generation of said write address signal, said second read address signal indicating an address differing from said write address by a predetermined distance so that said digital video data read out from said memory means is supplied back to said memory means for compensating a dropout via said correct video data producing circuit during a generation of said dropout detecting pulse.

2. The apparatus according to claim 1, in which said predetermined distance is substantially equal to a difference in addresses between an address at which a present digital video data is written and an address at which digital video data one horizontal line previous to said present digital video data is written, so that said digital video data on horizontal line previous to said present digital video data is written into said memory means instead of said present digital video data when a dropout occurs at said present digital video data.

3. The apparatus according to claim 2, in which said correct video data producing circuit means includes a phase inverting circuit for inverting a chroma phase of an output signal of said memory means.

4. The apparatus according to claim 3, further comprising divider means connected between said switching circuit means and said memory means for dividing said output signal of said switching circuit means into a plurality of channel signals so that said memory means is arranged so as to have a period of said write and read address signals longer than four times a memory cycle of said memory means.

5. The apparatus according to claim 4, further comprising a first latch circuit and a first PS (parallel to serial) converter connected serially between said memory means and an output terminal and a second latch circuit and a second PS converter connected serially between said memory means and said correct video data producing circuit means, said first and second latch circuits being driven by said first and second read address signals, respectively.

* * * * *